United States Patent
Sims, III et al.

(10) Patent No.: US 11,059,478 B2
(45) Date of Patent: Jul. 13, 2021

(54) SYSTEM AND METHOD FOR AUTONOMOUS CONTROL OF A VEHICLE

(71) Applicant: GM GLOBAL TECHNOLOGY OPERATIONS LLC, Detroit, MI (US)

(72) Inventors: Robert D. Sims, III, Milford, MI (US); Brian J. Hufnagel, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 16/155,971

(22) Filed: Oct. 10, 2018

(65) Prior Publication Data

US 2020/0114907 A1 Apr. 16, 2020

(51) Int. Cl.
| | |
|---|---|
| *B60W 30/085* | (2012.01) |
| *G05D 1/00* | (2006.01) |
| *G05D 1/02* | (2020.01) |
| *G08G 1/16* | (2006.01) |
| *B60W 30/095* | (2012.01) |

(52) U.S. Cl.
CPC ...... *B60W 30/085* (2013.01); *B60W 30/0956* (2013.01); *G05D 1/0088* (2013.01); *G05D 1/0276* (2013.01); *G08G 1/162* (2013.01); *G08G 1/166* (2013.01); *G05D 2201/0213* (2013.01)

(58) Field of Classification Search
CPC ............ B60W 30/085; B60W 30/0956; G05D 1/0088; G05D 1/0276; G08G 1/162; G08G 1/166
See application file for complete search history.

(56) References Cited

U.S. PATENT DOCUMENTS

| | | | |
|---|---|---|---|
| 9,669,827 B1 * | 6/2017 | Ferguson | G05D 1/0088 |
| 10,377,342 B1 * | 8/2019 | Wengreen | G06K 9/00838 |
| 10,386,480 B1 * | 8/2019 | Campbell | G01S 13/30 |
| 10,466,342 B1 * | 11/2019 | Zhu | G01S 17/10 |
| 2018/0188371 A1 * | 7/2018 | Bao | G01S 17/87 |
| 2018/0284279 A1 * | 10/2018 | Campbell | G01S 7/4817 |
| 2018/0299890 A1 * | 10/2018 | Ewert | B60W 50/14 |
| 2019/0049583 A1 * | 2/2019 | Xu | G01S 7/487 |
| 2019/0146060 A1 * | 5/2019 | Qiu | G01S 7/484 356/5.01 |
| 2019/0339383 A1 * | 11/2019 | Campbell | G01S 13/931 |
| 2020/0088844 A1 * | 3/2020 | Gao | G01S 7/487 |

* cited by examiner

*Primary Examiner* — Ramsey Refai

(57) ABSTRACT

An automotive vehicle includes at least one actuator configured to control vehicle steering, acceleration, or shifting, at least one sensor configured to emit a signal having a first encoding scheme and receive a return signal, and at least one controller in communication with the actuator and the sensor. The controller is configured to control the actuator according to a first mode and a second mode. The controller is further configured to, in response to the sensor receiving a return signal having the first encoding scheme, control the actuator according to the first mode and, in response to the sensor receiving a return signal not having the first encoding scheme, control the actuator according to the second mode.

14 Claims, 4 Drawing Sheets

SYSTEM AND METHOD FOR AUTONOMOUS CONTROL OF A VEHICLE

INTRODUCTION

The present disclosure relates to vehicles controlled by automated driving systems, particularly those configured to automatically control vehicle steering, acceleration, and braking during a drive cycle without human intervention.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes at least one actuator configured to control vehicle steering, acceleration, or shifting, at least one sensor configured to emit a signal having a first encoding scheme and receive a return signal, and at least one controller in communication with the actuator and the sensor. The controller is configured to control the actuator according to a first mode and a second mode. The controller is further configured to, in response to the sensor receiving a return signal having the first encoding scheme, control the actuator according to the first mode and, in response to the sensor receiving a return signal not having the first encoding scheme, control the actuator according to the second mode.

In an exemplary embodiment, the controller is further configured to infer a location of a target object external to the vehicle in response to the return signal not having the first encoding scheme. In such an embodiment, the second mode comprises defining a vehicle path based on the inferred presence of the target object at the location, and the first mode comprises defining a vehicle path in the absence of a target object at the location. In such embodiments, the controller may be configured to infer the location of the target object based on a return angle of the return signal and on an intensity of the return signal. The controller may be further configured to, in response to the inferred location being behind an identified object within a field of view of the at least one sensor, identify the target object as a multipath reflection and disregard the target object.

In an exemplary embodiment, the controller is further configured to, in response to the return signal having a second encoding scheme, distinct from the first encoding scheme, access a behavior model for predicting behavior of a target object external to the vehicle. The behavior model corresponds to the second encoding scheme. In such embodiments, the controller may be further configured to infer a location of the target object, with the second mode including defining a vehicle path based on the inferred presence of the target object at the location and on the behavior model, and the first mode including defining a vehicle path in the absence of a target object at the location.

In an exemplary embodiment, the at least one sensor comprises a LiDAR emitter and a LiDAR receiver.

A method of controlling a vehicle according to the present disclosure includes providing the vehicle with at least one actuator configured to control vehicle steering, acceleration, or shifting, at least one sensor configured to emit a signal having a first encoding scheme and receive return signals, and at least one controller in communication with the actuator and the sensor. The method also includes receiving, via the at least one sensor, a return signal. The method additionally includes determining, via the at least one controller, whether the return signal is encoded according to the first encoding scheme. The method further includes controlling, via the at least one controller, the at least one actuator according to a first mode in response to the return signal being encoded according to the first encoding scheme and according to a second mode in response to the return signal not being encoded according to the first encoding scheme.

In an exemplary embodiment, the method additionally includes, in response to the return signal not being encoded according to the first encoding scheme, inferring a location of a target object external to the vehicle. In such embodiments, the second mode may include defining a vehicle path based on the inferred presence of the target object at the location, and the first mode may include defining a vehicle path in the absence of a target object at the location. The inferring the location of the target object may be based on a return angle of the return signal and on an intensity of the return signal.

In an exemplary embodiment, the method additionally includes determining, via the at least one controller, whether the return signal is encoded according to a second encoding scheme. The second method is distinct from the first encoding scheme. In such embodiments, the method also includes, in response to the return signal being encoded according to the second encoding scheme, accessing, via the at least one controller, a behavior model for predicting behavior of a target object external to the vehicle, the behavior model corresponding to the second encoding scheme. Such embodiments may further include, in response to the return signal not being encoded according to the first encoding scheme, inferring a location of a target object external to the vehicle. The second mode may include defining a vehicle path based on the inferred presence of the target object at the location and on the behavior model, and the first mode may include defining a vehicle path in the absence of a target object at the location.

In an exemplary embodiment, the at least one sensor comprises a LiDAR emitter and a LiDAR receiver.

Embodiments according to the present disclosure provide a number of advantages. For example, systems and methods according to the present disclosure may obtain information about the presence of objects proximate a sensor, even when such objects are outside of the field of view of the sensor, based on interfering signals.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
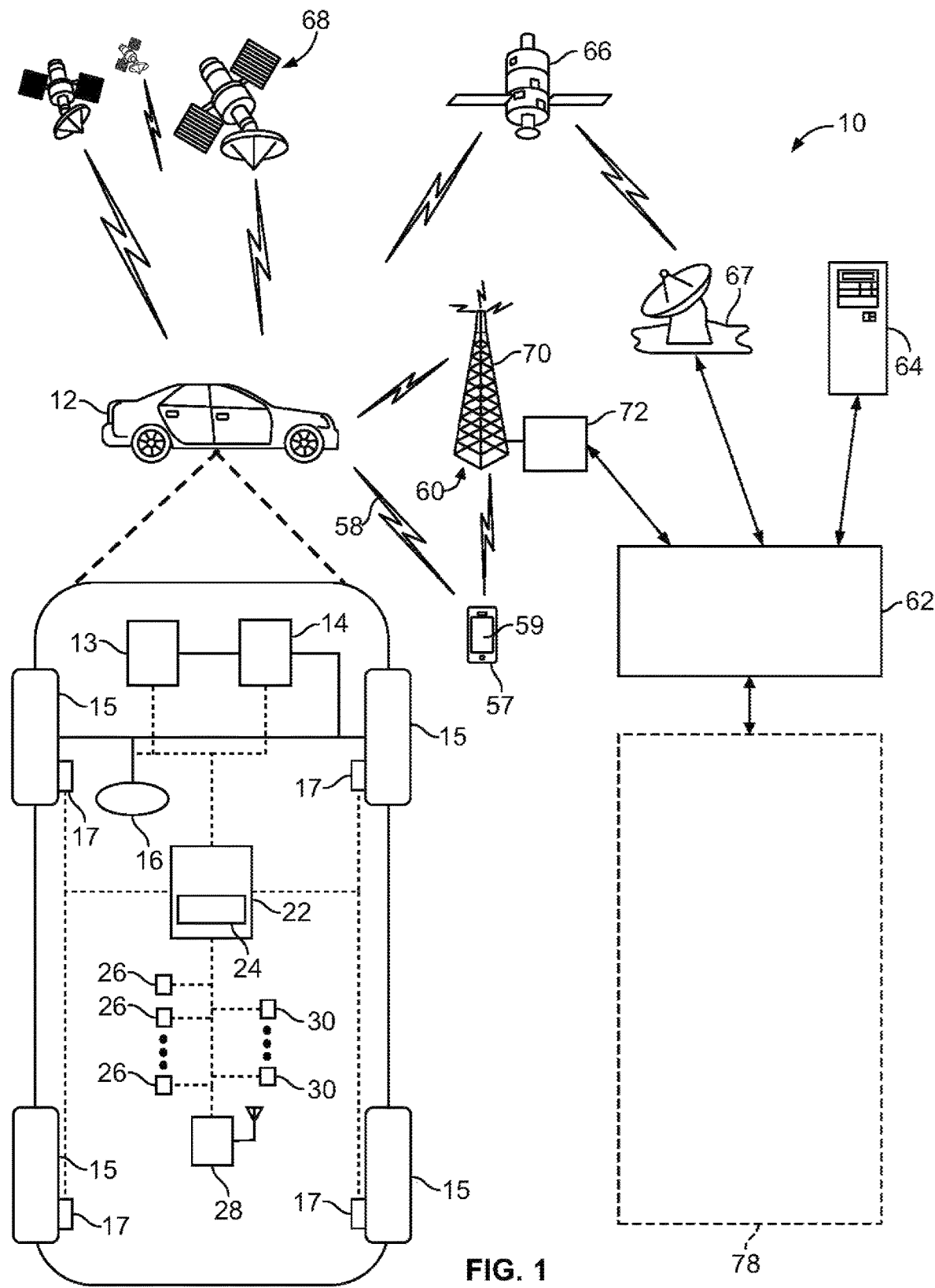
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Three automation system. A Level Three system indicates "Conditional Automation", referring to the driving mode-specific performance by an automated driving system of all aspects of the dynamic driving task with the expectation that the human driver will respond appropriately to a request to intervene.

Other embodiments according to the present disclosure may be implemented in conjunction with so-called Level One or Level Two automation systems. A Level One system indicates "driver assistance", referring to the driving mode-specific execution by a driver assistance system of either steering or acceleration using information about the driving environment and with the expectation that the human driver perform all remaining aspects of the dynamic driving task. A Level Two system indicates "Partial Automation", referring to the driving mode-specific execution by one or more driver assistance systems of both steering and acceleration using information about the driving environment and with the expectation that the human driver perform all remaining aspects of the dynamic driving task.

Still other embodiments according to the present disclosure may also be implemented in conjunction with so-called Level Four or Level Five automation systems. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
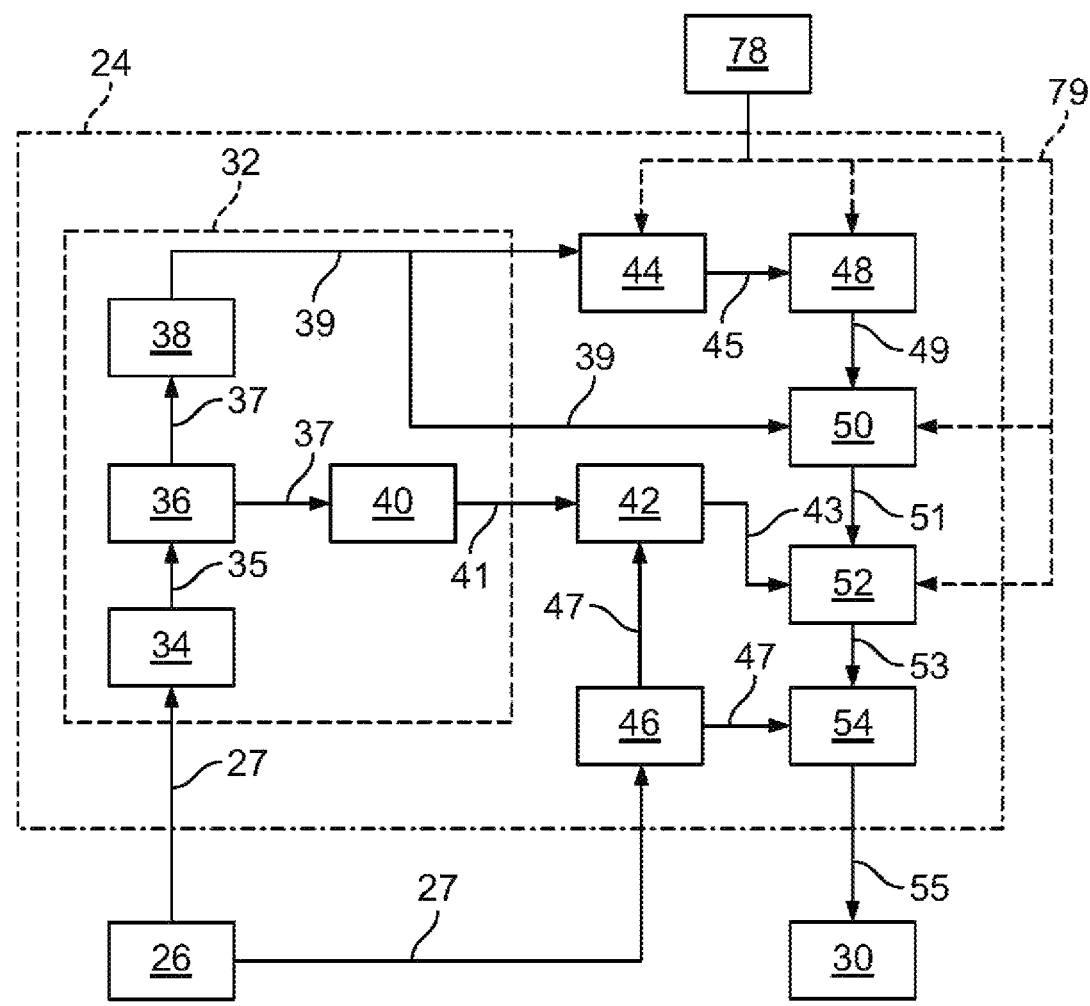
FIG. 2 is a schematic block diagram of an automated driving system (ADS) for a vehicle according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation module 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

Figure 3:
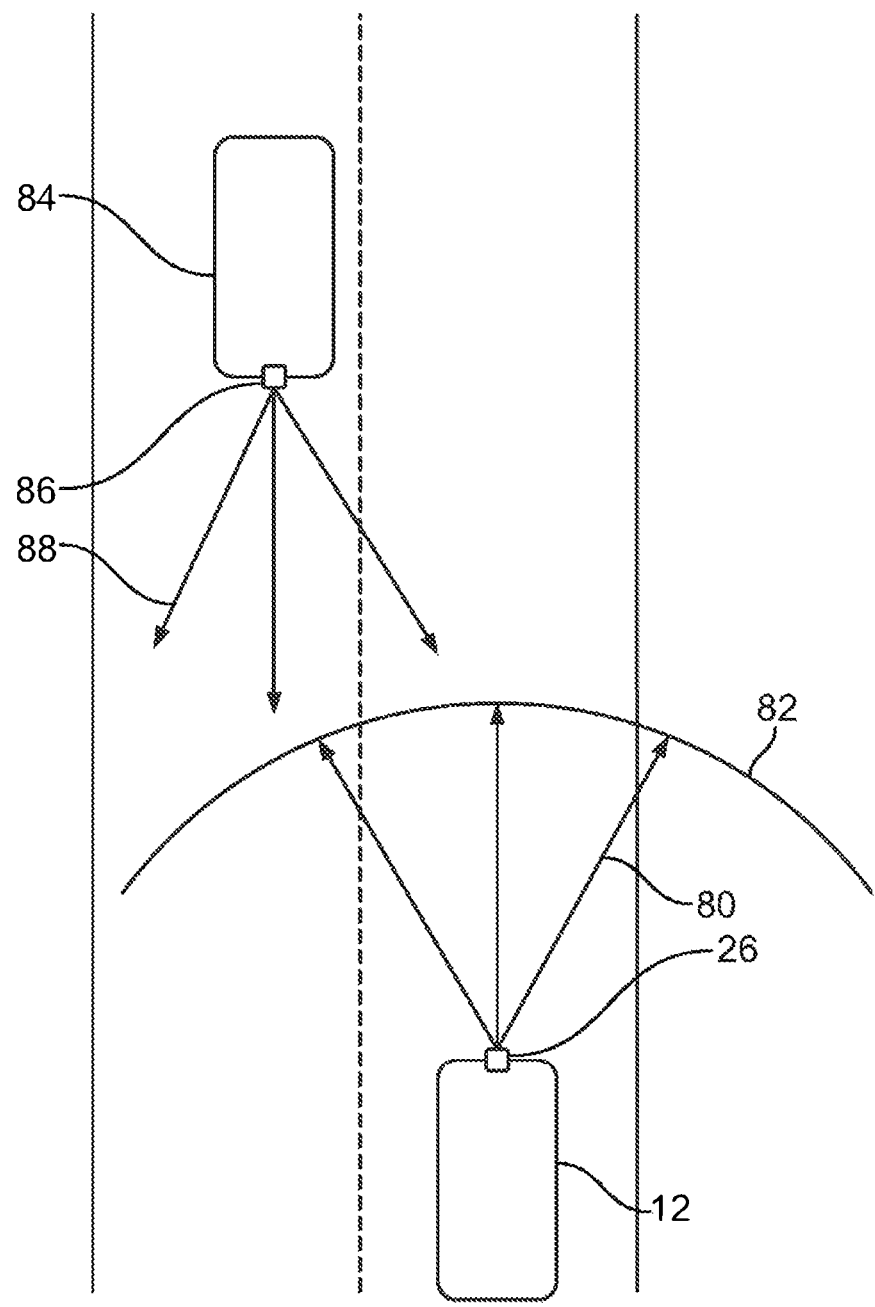
FIG. 3A is an illustration of a host vehicle proximate a target vehicle according to an embodiment of the present disclosure.

One challenge associated with certain sensors, such as LiDAR, is that of interference. Referring to FIG. 3, at least one sensor 26 of the vehicle 12, which may be referred to as the host vehicle, is a LiDAR sensor including an emitter configured to emit light signals 80 and a receiver configured to receive a return signal when the light signals 80 reflect off of an object. The LiDAR sensor 26 has a field of view or maximum operating range 82 defined by various parameters such as the power of the emitter and the resolution of the receiver. A target vehicle 84 is located in the vicinity of the vehicle 12. The target vehicle 84 is also provided with a LiDAR sensor 86 which is likewise configured to emit light signals 88. The receiver of the LiDAR sensor 26 may detect the light signals 88 from the LiDAR sensor 86 of the target vehicle 84, resulting in interference. In the illustrated configuration, the target vehicle 84 is located outside of the field of view 82 of the LiDAR sensor 26; however, interference may likewise result from objects within the field of view 82.

Various techniques may be used to reduce or eliminate such interference. One such technique is pulse encoding, e.g. varying the frequency of pulses emitted by the LiDAR sensor 26 according to a known pattern. Received signals may thereafter be filtered to discard light signals which did not originate from the LiDAR sensor 26. Such techniques treat signals originating outside the host vehicle 12 as noise and do not derive useful information therefrom.

Figure 4:
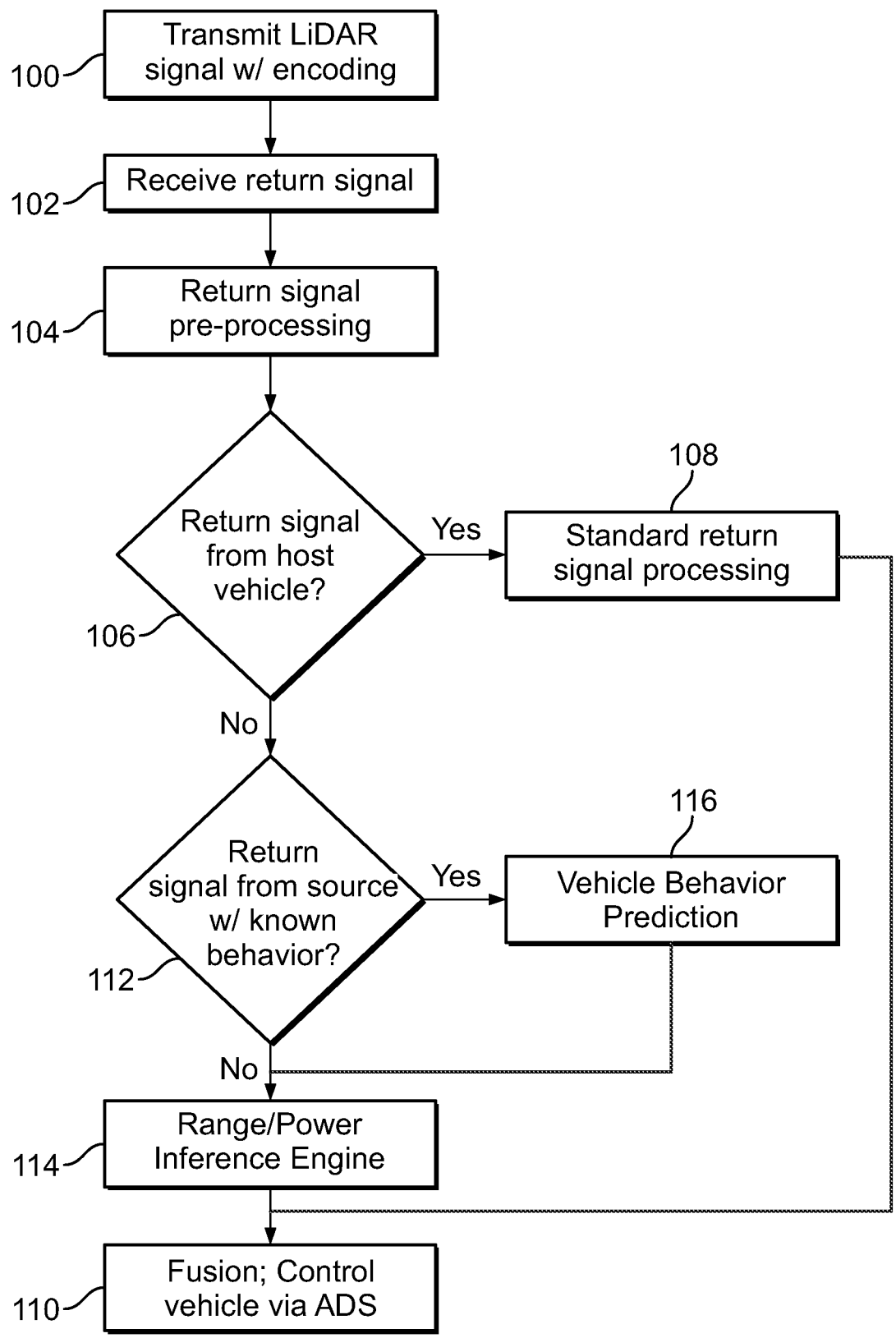
FIG. 4 is a flowchart representations of a method of controlling a vehicle according to an embodiment of the present disclosure.

Referring now to FIG. 4, a method for controlling a vehicle according to the present disclosure is illustrated in flowchart form. In an exemplary embodiment, this method is performed by the controller 22 as part of the automated driving system 24, e.g. as part of the sensor fusion and preprocessing module 34 or other portion of the perception system 32.

An encoded LiDAR signal is emitted, as illustrated at block 100. In an exemplary embodiment, this is performed via the controller 22 controlling a LiDAR emitter among the sensors 26 to emit pulsed light signals according to an encoding scheme as discussed above.

A return signal is received, as illustrated at block 102. In an exemplary embodiment, this is performed via a LiDAR receiver among the sensors 26. As will be discussed in further detail below, the return signal may be a return signal based on the signal emitted in block 100, an interfering signal from an external source, or a combination thereof.

The return signal is pre-processed, as illustrated at block 104. In an exemplary embodiment, this is performed via the controller 22. The pre-processing step comprises identifying an encoding scheme of the return signal, if any exists.

A determination is made of whether the return signal originated with the host vehicle 12, as illustrated at operation 106. In an exemplary embodiment, this determination is based on a comparison of the return signal encoding scheme obtained from block 104 with the transmitted signal encoding scheme from block 100. In response to the encoding schemes being consistent, a determination may be made that the return signal originated from the host vehicle 12. In response to the encoding schemes differing, a determination may be made that the return signal originated from an external source.

In response to the determination of operation 106 being positive, i.e. the return signal originated with the host vehicle 12, then processing of the signal continues according to the default perception system of the ADS 24, as illustrated at block 108. In an exemplary embodiment, this includes processing the return signal to obtain point cloud data which is communicated to the perception system 32 for fusion with other sensor data. The actuators 30 are then controlled according to the ADS 24, as illustrated at block 110.

In response to the determination of operation 106 being negative, i.e. the return signal does not originate from the host vehicle, then a determination is made of whether the return signal originated from a source associated with known behavior. As an example, the controller 22 may be provided with a lookup table containing pulse encoding schemes associated with one or more autonomous vehicle fleets, e.g. stored in non-transient data memory. The determination may be based on a comparison of the return signal encoding scheme obtained from block 104 with the pulse encoding schemes in the lookup table. In response to the return signal encoding scheme being consistent with a pulse encoding scheme in the lookup table, a determination may be made that the return signal originated from the associated source.

In response to the determination of operation 112 being negative, i.e. the return signal did not originate from a source with known behavior, then a range and direction of the signal origin are estimated, as illustrated at block 114. The direction of the signal origin may be inferred based on the return angle of the received signal. Multipath reflections may be filtered out by analyzing objects which are detected within the field of view of the sensors 26. As an example, if a wall is within the field of view of the sensors 26, then an assumption may be made that the signal origin is not positioned behind the wall. The range to the signal origin may be estimated based on the intensity of the return signal. In an exemplary embodiment, the amplitude of the signal is converted into an approximate range based on allowable eye safety limits or other regulatory or practical limits on signal power. For purposes of this approximation, time of flight may be disregarded. Control then proceeds to block 110 and the actuators 30 are controlled according to the ADS 24.

In response to the determination of operation 112 being positive, i.e. the return signal did originate from a source with known behavior, then a predictive behavior model is obtained, as illustrated at block 116. The behavior model may be obtained from the lookup table discussed above. In an exemplary embodiment, the behavior model is configured to predict behavior of the origin of the return signal based on various conditions. As an example, in response to the return signal encoding scheme being consistent with a known autonomous vehicle fleet, then the behavior model may indicate operating behavior of vehicles in that fleet in response to external obstacles. The behavior model is communicated to the perception system 32, e.g. the object prediction module 38. Control then proceeds to block 114.

Advantageously, the ADS 24 may thereby obtain information about the presence of objects, even when such objects are outside of the field of view of the sensors 26, based on interfering signals. Knowledge of the approximate location of such objects and, if available, behavior models for such objects may enable the ADS 24 to make more accurate decisions regarding path planning, acceleration, and other performance characteristics, thereby increasing customer satisfaction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   at least one actuator configured to control vehicle steering, acceleration, or shifting;
   at least one sensor configured to emit a signal having a first encoding scheme and receive a return signal;

at least one controller in communication with the actuator and the sensor, the controller being configured to control the actuator according to a first mode and a second mode, the controller being further configured to, in response to the sensor receiving a return signal having the first encoding scheme, control the actuator according to the first mode and, in response to the sensor receiving a return signal not having the first encoding scheme, control the actuator according to the second mode.

2. The automotive vehicle of claim 1, wherein the controller is further configured to infer a location of a target object external to the vehicle in response to the return signal not having the first encoding scheme, wherein the second mode comprises defining a vehicle path based on the inferred presence of the target object at the location, and wherein the first mode comprises defining a vehicle path in the absence of a target object at the location.

3. The automotive vehicle of claim 2, wherein the controller is configured to infer the location of the target object based on a return angle of the return signal and on an intensity of the return signal.

4. The automotive vehicle of claim 3, wherein the controller is further configured to, in response to the inferred location being behind an identified object within a field of view of the at least one sensor, identify the target object as a multipath reflection and disregard the target object.

5. The automotive vehicle of claim 1, wherein the controller is further configured to, in response to the return signal having a second encoding scheme, distinct from the first encoding scheme, access a behavior model for predicting behavior of a target object external to the vehicle, the behavior model corresponding to the second encoding scheme.

6. The automotive vehicle of claim 5, wherein the controller is further configured to infer a location of the target object, wherein the second mode comprises defining a vehicle path based on the inferred presence of the target object at the location and on the behavior model, and wherein the first mode comprises defining a vehicle path in the absence of a target object at the location.

7. The automotive vehicle of claim 1, wherein the at least one sensor comprises a LiDAR emitter and a LiDAR receiver.

8. A method of controlling a vehicle, comprising:
providing the vehicle with at least one actuator configured to control vehicle steering, acceleration, or shifting, at least one sensor configured to emit a signal having a first encoding scheme and receive return signals, and at least one controller in communication with the actuator and the sensor;
receiving, via the at least one sensor, a return signal;
determining, via the at least one controller, whether the return signal is encoded according to the first encoding scheme; and
controlling, via the at least one controller, the at least one actuator according to a first mode in response to the return signal being encoded according to the first encoding scheme and according to a second mode in response to the return signal not being encoded according to the first encoding scheme.

9. The method of claim 8, further comprising, in response to the return signal not being encoded according to the first encoding scheme, inferring a location of a target object external to the vehicle.

10. The method of claim 9, wherein the second mode comprises defining a vehicle path based on the inferred presence of the target object at the location, and wherein the first mode comprises defining a vehicle path in the absence of a target object at the location.

11. The method of claim 9, wherein the inferring the location of the target object is based on a return angle of the return signal and on an intensity of the return signal.

12. The method of claim 8, further comprising:
determining, via the at least one controller, whether the return signal is encoded according to a second encoding scheme, distinct from the first encoding scheme; and
in response to the return signal being encoded according to the second encoding scheme, accessing, via the at least one controller, a behavior model for predicting behavior of a target object external to the vehicle, the behavior model corresponding to the second encoding scheme.

13. The method of claim 12, further comprising, in response to the return signal not being encoded according to the first encoding scheme, inferring a location of a target object external to the vehicle, wherein the second mode comprises defining a vehicle path based on the inferred presence of the target object at the location and on the behavior model, and wherein the first mode comprises defining a vehicle path in the absence of a target object at the location.

14. The method of claim 8, wherein the at least one sensor comprises a LiDAR emitter and a LiDAR receiver.

* * * * *